Jan. 31, 1956
C. S. SCHROEDER
2,732,904
HYDRAULIC TYPE POWER STEERING
Filed Oct. 5, 1951
2 Sheets—Sheet 2
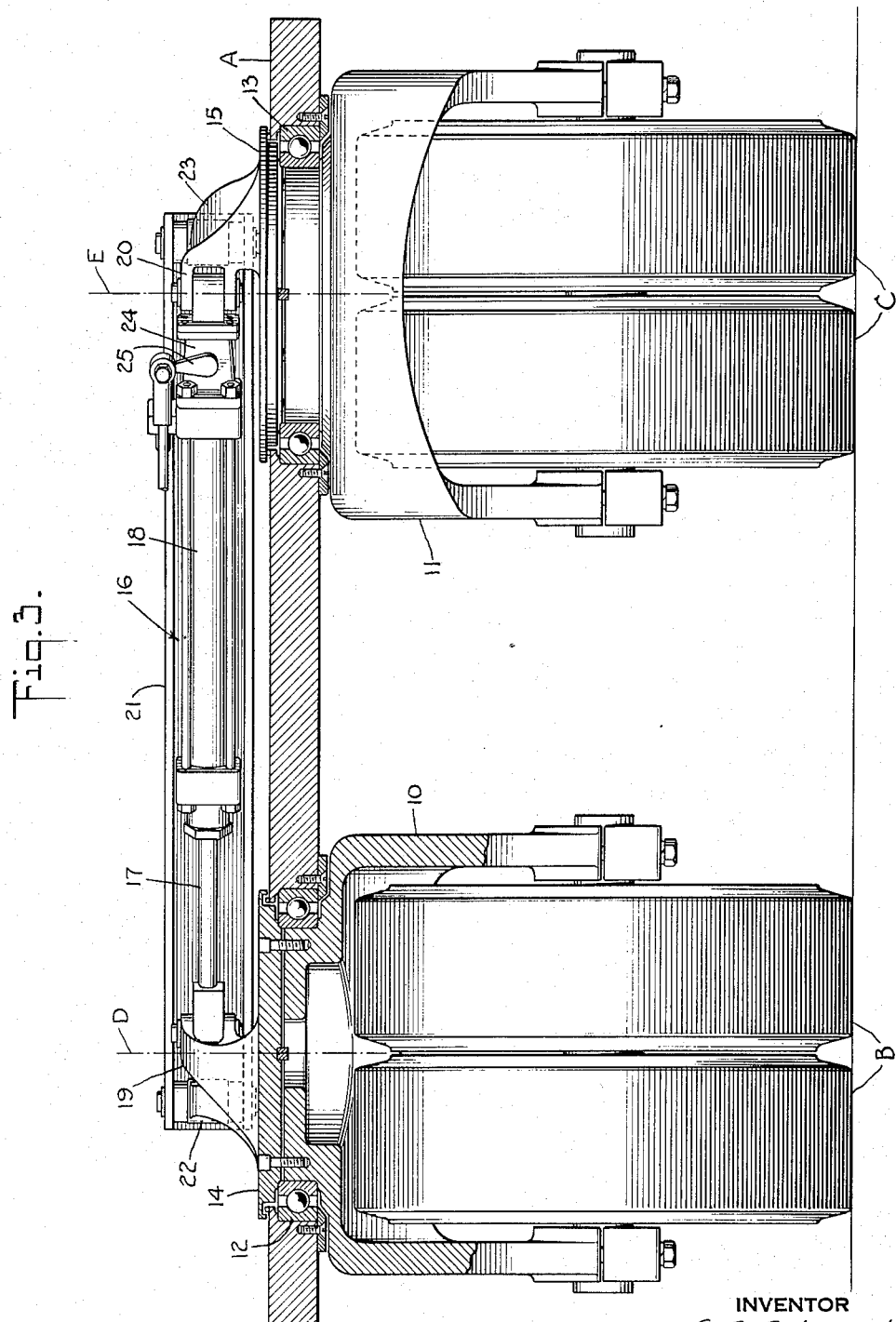
INVENTOR
C. S. Schroeder
BY
A. H. Golden
ATTORNEY

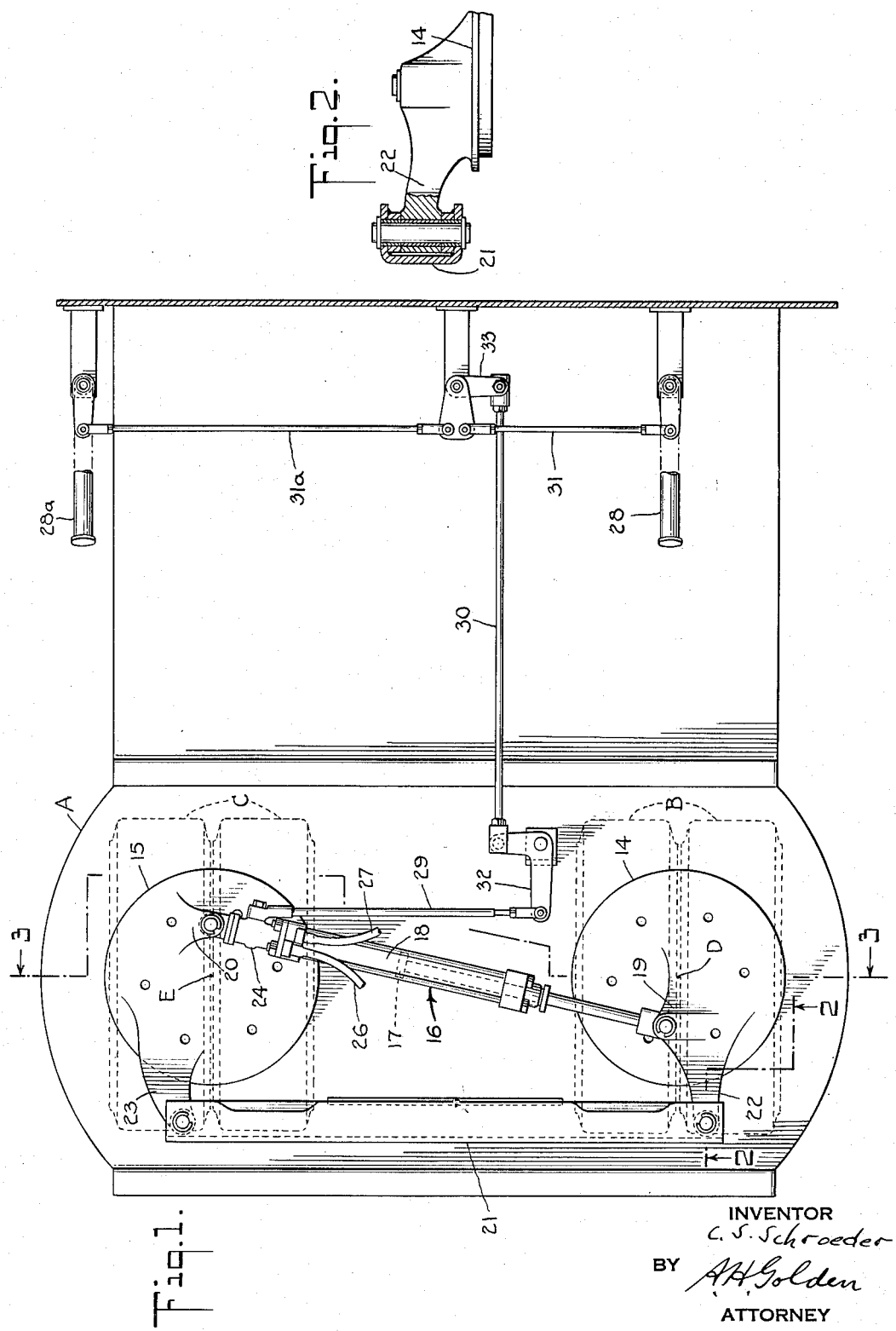

United States Patent Office 2,732,904
Patented Jan. 31, 1956

2,732,904

HYDRAULIC TYPE POWER STEERING

Charles S. Schroeder, Philadelphia, Pa., assignor to The Yale & Towne Manufacturing Company, Stamford, Conn., a corporation of Connecticut Application October 5, 1951, Serial No. 249,824

10 Claims. (Cl. 180—79.2)

This invention relates to vehicle steering mechanism that is power operated and more particularly to an improved mechanism of the class in which the steering movements of the wheels are produced by a thrusting means such as a ram. It has been customary in steering mechanisms of this general class to utilize the movement of one end of a ram to steer the wheels through a suitable linkage. Sometimes two rams or their equivalent have been used, but in any case each ram was anchored to the vehicle frame or undercarriage so that the reaction of the ram was used merely in support of the moving end of the ram, and did not in itself produce any useful movement. Obviously, in such an arrangement, the ram and the linkage must accept the entire force required to steer the wheels at both sides of the vehicle, and in some types of vehicles now in use this force is of a very considerable magnitude. It is also characteristic of such prior mechanism that the steering force is transmitted to at least one of the wheels through a tie rod or other part of the linkage that holds the wheels in steering alignment, and this part of the linkage therefore cannot serve the aligning function exclusively. By my invention, I have now contributed an extremely novel steering mechanism that distinguishes in several important respects over the steering mechanisms heretofore provided in this general class, as will appear.

As one very important feature of my invention, the reaction that results from the thrusting means in turning the steering wheel at one side of the vehicle is utilized for turning in the same direction the steering wheel at the opposite side of the vehicle. This is accomplished in the preferred form of my invention by so arranging a ram as to apply its thrusting action directly between the two rotating means through which the opposite wheels are steered. There is a distinct advantage in utilizing the reaction of the ram in this manner because the steering forces upon the opposed wheels thereby tend to balance each other, and no single part is required to accept the forces necessary to steer both wheels. Also because of this balancing effect, the means that holds the wheels in alignment is not required primarily to accept the steering forces.

As another feature of the invention, I may control the ram through the action of a valve of the type that causes the wheels to follow the movements of a steering handle, this valve being so arranged, however, as to control the two parts of the ram that in my invention move in opposite directions.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a plan view showing a preferred form of my novel steering mechanism and a portion of a vehicle to which it is applied.

Fig. 2 is a partial view taken on the line 2—2 in Fig. 1.

Fig. 3 is a cross-sectional view taken on the line 3—3 in Fig. 1.

For the purpose of describing the invention, I have shown my novel steering mechanism as embodied in a truck having a frame A, and wheels B and C that are mounted for steering movement at opposite sides of the frame. The particular construction shown is adapted for carrying extremely heavy loads and utilizes yokes 10 and 11 for independently mounting the wheels B and C in pairs upon the frame A. The yokes 10 and 11 are pivoted for turning about vertical axes in bearings 12, 13, and pivoting integrally with the yokes are parts 14, 15 that located above the frame A. The parts 14, 15 do of course afford means through which steering forces may conveniently be applied to the wheels. The particular details of the wheel mountings are conventional, however, and it is merely necessary to realize that the steering wheels at the respective sides of the vehicle may be turned through rotation of the yokes 10 and 11.

In the preferred form of my invention, the thrusting action of a ram 16 is applied in a novel manner for steering the wheels B and C through the lever action of the parts 14 and 15, and these parts therefore may also be termed lever members. Ram 16 is preferably of the class that has a piston 17 sliding within a cylinder 18, and that is double acting so that it may apply both thrust and pull.

Integrally formed with the member 14 is an arm 19 to which the piston 17 is connected, while the lever member 15 has an arm 20 to which the ram cylinder 18 is connected. It is important to note that the connections provided by the arms 19 and 20 are at opposite sides of the members 14, 15 when considered from the standpoint of the vertical axes D and E of the wheels B and C. Through this arrangement, the ram 16 will act directly with balanced forces upon both of the pivotal wheel mountings to steer the wheels together in one direction.

It may be observed that the ram 16 will not in itself best coordinate the steering movements of the wheels B and C, and in order to provide most effective angular coordination suitable means may be utilized such as a tie member that I have indicated by the numeral 21. The tie member 21 is pivotally connected at its ends to arms 22, 23 integral with the lever members 14, 15 and moves those members while holding them in coordinated angular relation to one another. In my invention, the coordinating means as represented by the tie member 21 does not primarily carry the steering forces since these forces are balanced, and accepts only those incidental forces that may be required to hold the wheels in steering alignment.

In the novel steering mechanism that I have now described, the operator may control the steering movements of the wheels through any suitable valve or other means that will control the fluid pressures exerted against the opposite faces of the piston 17 in the ram 16. As a further development of my invention, however, I operate the ram 16 particularly through a control valve 24 of the type that is employed to cause a power operated part to follow the movements of a controlling member to which the valve is mechanically connected. In my invention, the control valve 24 is integrally mounted at one end of the ram cylinder 18 and the casing of this valve serves to connect the cylinder to the pivot of the arm 20 on the lever member 15. As is customary in control valves of this type, the valve 24 has an actuating lever 25 (Fig. 3) and fluid inlet and outlet tubes 26, 27 (Fig. 1), and the valve is so constructed that a short movement of the lever 25 in either direction will admit fluid under pressure selectively to either face of the piston 17, thus causing extension or retraction of the ram, while the lever 25 in an intermediate position will cut off the flow of fluid so as to lock the ram. The actuating lever 25 is mechanically connected to a steering handle 28 through a cross rod 29, a drag link 30, a connecting rod 31, and bell cranks 32 and 33. Because of the fact that both parts of the ram 16 undergo movement in opposite directions, it will be observed that the ram actually has no stationary point of reference through which to govern the action of the valve 24. This governing action is provided by the tie member 21, however, since both ends of the ram are thereby required to move simultaneously, and therefore the control valve 24 will itself move bodily according to the steering movements of the wheels and will enable the operator to control these movements precisely through the steering handle 28.

For purposes of convenience in operating the vehicle, the steering handle 28 is located at one side thereof and a duplicate steering handle 28a is located at the opposite side and connected to the bell crank 33 by a connecting rod 31a. The operator may use either of the handles 28 and 28a for swinging the valve lever 25 so as to cause either extension or retraction of the ram 16 and thereby steer the wheels B and C in either direction.

I now claim:

1. In a truck of the class described, a pair of steering wheels, a mounting member mounting each of said wheels for steering rotation about a steering axis, means connecting the wheel mounting members to one another for insuring rotation of said members together, a ram comprising a cylinder and a piston, means pivoting the piston to one of said mounting members at a particular point relatively to its steering axis, and means pivoting the cylinder to the other of said mounting members at a point relatively to its steering axis so related to the particular point where the piston is pivoted to said first mounting member that the relative movement of said piston and cylinder rotates said mounting members to steer said wheels.

2. In a truck of the class described, a pair of steering wheels, a mounting member mounting each of said wheels for steering rotation about a steering axis, means connecting the wheel mounting members to one another for insuring rotation of said members together, a ram comprising a cylinder and a piston, means pivoting the piston to one of said mounting members at a particular point relatively to its steering axis, and means pivoting the cylinder to the other of said mounting members at a point so arranged in complementary relation to the said particular point at which the piston is pivoted to said first mounting member that the relative movement of said piston and cylinder rotates said mounting members to steer said wheels.

3. In a truck of the class described, a pair of steering wheels, a mounting member mounting each of said wheels for steering rotation about a steering axis, a ram comprising a cylinder and a piston, means pivoting the piston to one of said mounting members at a particular point relatively to its steering axis, mean pivoting the cylinder to the other of said mounting members at a point so arranged in complementary relation to the said particular point at which the piston is pivoted to said first mounting member that the relative movement of said piston and cylinder rotates said mounting members to steer said wheels, and a tie rod pivoted at its ends to said mounting members to insure their rotation together.

4. In a truck, a pair of steering wheels, a mounting member for each wheel, means pivotally mounting each of said mounting members for rotation to steer its wheel, a fluid operated ram, means whereby said ram applies a direct thrust to each of said mounting members at a predetermined point relatively to its pivotal mounting for rotating both of said mounting members simultaneously in the same direction as said ram is extended and contracted, and additional means connecting said mounting members to one another for insuring the rotation of said mounting members together.

5. In a truck, steering wheels, a pair of spaced mounting members, means mounting one of said wheels on each mounting member, bearing means on which each of said mounting members rotates on a steering axis, power means including two parts and means for applying power between said parts with said parts reacting exclusively through one another to produce thrust and pull, means so connecting each of said parts to one of said mounting members that the thrust and pull is applied for rotating both mounting members simultaneously in the same direction, said two parts of the power means by reacting through one another equalizing the thrust and pull relatively to both mounting members, and additional means of connection between said mounting members for insuring the rotation of said mounting members together.

6. In a truck of the class described, a pair of steering wheels, a lever member for each wheel, means mounting each lever member to turn on an axis for steering its wheel, a fluid-operated ram having opposed ends movable relatively to one another to exert thrust and pull, means for apply the thrust and pull from one end of said ram directly to one of said lever members at a particular point relatively to its axis, means for applying the thrust and pull from the other end of said ram directly to the second of said lever members at a point so related to the particular point at which the thrust and pull is applied to the first lever member that the reaction of said ram due to thrust on either lever member turns the other lever member on its axis to steer said wheels, and additional means connecting said lever members to one another for insuring simultaneous turning movement of both lever members.

7. In a truck, steering wheels, a pair of spaced mounting members, means mounting one wheel on each mounting member, bearing means on which each of said mounting members rotates on a steering axis, a floating power member including two parts movable relatively to one another and means for applying power between said parts with each part reacting throught the other to produce thrust and pull, means supporting said power member for floating between said mounting members comprising means connecting one of said parts to one of said mounting members and the other of said parts to the other of said mounting members whereby the thrust and pull of said floating power member is at all times equalized between said mounting members, said connecting means being positioned relatively to the steering axis of each mounting member to effect steering rotation of the wheels upon actuation of the power means, and additional means of connection between said mounting members for insuring rotation of said mounting members together.

8. In a truck, steering wheels, a pair of spaced mounting members, means mounting one wheel on each mounting member, power means having two parts movable relatively to one another for effecting thrust and pull between said mounting members, means connecting one of said parts to one of said mounting members and the other of said parts to the other mounting member so that the thrust and pull of said power means is at all times equalized between said mounting members, bearing means on which each of said mounting members rotates on a steering axis, said connecting means being positioned relatively to the steering axis of each mounting member to rotate said steering wheels as the power means applies thrust and pull between said mounting members, and additional means of connection between said mounting members for insuring rotation of said mounting members together.

9. In a truck, steering wheels, a pair of spaced mounting members, means mounting one of said wheels on each mounting member, bearing means on which each of said mounting members rotates on a steering axis, means connecting said mounting members for rotation together on their bearing means, power means including two parts movable relatively to one another and means for applying power between said parts with each part reacting through the other to produce thrust and pull, means connecting one of said parts to each of said mounting members at a predetermined point whereby the thrust and pull is effective to turn both mounting members simultaneously in the same direction, the said two parts by reacting relatively to one another equalizing at all times the thrust and pull between the mounting members, a steering handle, and means through which said steering handle controls the power applied between the said two parts of the power means to cause both mounting members to follow the movements of said steering handle for steering the truck.

10. In a truck, a pair of steering wheels, a mounting member for each wheel, means pivotally mounting each of said mounting members for rotation on a steering axis, means connecting said mounting members for rotation together on their pivotal mountings, a ram having opposed ends movable relatively to one another, means securing the opposed ends of said ram to said mounting members at predetermined points relatively to the steering axes of the members to rotate said steering wheels as the opposed ends of the ram move relatively to one another, and said predetermined points being so positioned on opposite sides of the steering axes that the ram rotates the wheels simultaneously in the same direction.

References Cited in the file of this patent

UNITED STATES PATENTS

| | | |
|---|---|---|
| 302,833 | Foye | July 29, 1884 |
| 1,162,418 | Uhlrig | Nov. 30, 1915 |
| 1,632,665 | Mitchell | June 14, 1927 |
| 2,163,892 | Sanford et al. | June 27, 1939 |
| 2,334,918 | French | Nov. 23, 1943 |
| 2,427,340 | Allison | Sept. 16, 1947 |
| 2,557,513 | Quartullo | June 19, 1951 |

FOREIGN PATENTS

| | | |
|---|---|---|
| 9,235 | Great Britain | Apr. 21, 1904 |